United States Patent
Yan et al.

(10) Patent No.: US 8,155,131 B2
(45) Date of Patent: Apr. 10, 2012

(54) METHOD, SYSTEM AND ROUTER FOR COMMUNICATION BETWEEN IP DEVICES

(75) Inventors: Gang Yan, Shenzhen (CN); Cheng Sheng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 243 days.

(21) Appl. No.: 12/488,102

(22) Filed: Jun. 19, 2009

(65) Prior Publication Data

US 2009/0257440 A1    Oct. 15, 2009

Related U.S. Application Data

(63) Continuation-in-part of application No. PCT/CN2007/071054, filed on Nov. 13, 2007.

(30) Foreign Application Priority Data

Dec. 22, 2006   (CN) .......................... 2006 1 0170031

(51) Int. Cl.
    *H04L 12/28* (2006.01)
(52) U.S. Cl. ........ 370/401; 370/217; 370/219; 370/238; 370/252; 370/392
(58) Field of Classification Search .................. 370/217, 370/219, 238, 252, 351, 392, 401
    See application file for complete search history.

(56) References Cited

U.S. PATENT DOCUMENTS

| | | | |
|---|---|---|---|
| 5,473,599 A | * | 12/1995 | Li et al. |
| 6,418,476 B1 | * | 7/2002 | Luciani ........................ 709/238 |
| 6,577,634 B1 | * | 6/2003 | Tsukakoshi et al. ..... 370/395.31 |
| 6,954,794 B2 | * | 10/2005 | Rudd et al. .................... 709/230 |
| 7,010,716 B2 | * | 3/2006 | Yu et al. ........................ 714/4.12 |
| 7,036,051 B1 | * | 4/2006 | Fernandes |
| 7,079,493 B2 | * | 7/2006 | Nakamichi et al. ........... 370/252 |
| 7,152,179 B1 | * | 12/2006 | Critchfield ................... 714/4.11 |

(Continued)

FOREIGN PATENT DOCUMENTS

CN   1561034 A   1/2005

(Continued)

OTHER PUBLICATIONS $1^{st}$ Office Action in corresponding Chinese Application No. 200610170031.7 (Jan. 9, 2009).

(Continued)

*Primary Examiner* — Phirin Sam
*Assistant Examiner* — Andrew C Lee
(74) *Attorney, Agent, or Firm* — Leydig, Voit & Mayer, Ltd.

(57) ABSTRACT

A method for communication between IP devices is provided. The method includes: receiving a dynamic routing protocol control packet sent by each of actual physical routers in a virtual router; obtaining a virtual IP address according to the dynamic routing protocol control packet; and using the virtual IP address as a next hop address and sending information to be sent to an external network to the virtual router. Further, a system and a router for communication between IP devices are also provided. Through the technical solutions of the present invention, when the master router is transited, the conversion of the internal dynamic routing protocol matches with the transiting of the master router performed by the virtual. Thus, it is ensured that the transited master router can receive the information sent by the internal router in a short time.

13 Claims, 8 Drawing Sheets

U.S. PATENT DOCUMENTS

| | | | |
|---|---|---|---|
| 7,209,486 B2* | 4/2007 | Nakahara | |
| 7,260,648 B2* | 8/2007 | Tingley et al. | 709/245 |
| 7,392,424 B2* | 6/2008 | Ho et al. | 714/4.4 |
| 7,433,317 B2 | 10/2008 | Kobayashi et al. | |
| 7,489,700 B2* | 2/2009 | Oogushi | |
| 7,643,421 B2* | 1/2010 | Tsuge et al. | 370/235 |
| 7,660,324 B2* | 2/2010 | Oguchi et al. | 370/432 |
| 7,859,992 B2* | 12/2010 | Buchko et al. | 370/217 |
| 7,864,770 B1* | 1/2011 | Baker | 370/392 |
| 2002/0016926 A1* | 2/2002 | Nguyen et al. | 713/201 |
| 2002/0184387 A1* | 12/2002 | Yamaya et al. | |
| 2002/0186698 A1* | 12/2002 | Ceniza | |
| 2003/0018520 A1* | 1/2003 | Rosen | |
| 2003/0093557 A1 | 5/2003 | Giraud et al. | |
| 2003/0218982 A1* | 11/2003 | Folkes et al. | 370/238 |
| 2004/0052260 A1* | 3/2004 | Tabu | |
| 2004/0076121 A1* | 4/2004 | Yang et al. | 370/253 |
| 2004/0085965 A1* | 5/2004 | Fotedar | 370/395.31 |
| 2004/0162914 A1* | 8/2004 | St. Pierre et al. | 709/245 |
| 2004/0213272 A1* | 10/2004 | Nishi et al. | 370/401 |
| 2006/0106934 A1* | 5/2006 | Figaro et al. | |
| 2006/0149851 A1* | 7/2006 | Matsumoto et al. | 709/238 |
| 2006/0256767 A1* | 11/2006 | Suzuki et al. | 370/351 |
| 2007/0008880 A1* | 1/2007 | Buchko et al. | |
| 2007/0104198 A1* | 5/2007 | Kalluri et al. | 370/392 |
| 2007/0165515 A1* | 7/2007 | Vasseur | 370/216 |
| 2007/0230472 A1* | 10/2007 | Jesuraj | 370/392 |
| 2008/0159150 A1* | 7/2008 | Ansari | |
| 2009/0252173 A1* | 10/2009 | Sampath et al. | 370/400 |
| 2011/0194567 A1* | 8/2011 | Shen | |

FOREIGN PATENT DOCUMENTS

| | | |
|---|---|---|
| CN | 1607772 A | 4/2005 |
| CN | 1838635 A | 9/2006 |
| CN | 101005452 A | 7/2007 |
| EP | 1 309 135 A1 | 5/2003 |
| JP | 2006-050307 A | 2/2006 |

OTHER PUBLICATIONS

1$^{st}$ Office Action in corresponding European Application No. 07817244.2 (Dec. 17, 2010).

Written Opinion of the International Searching Authority in corresponding PCT Application No. PCT/CN2007/071054 (Mar. 6, 2008).

Knight et al., "RFC 2338—Virtual Router Redundancy Protocol," Apr. 1998, The Internet Society, Reston, Virginia.

Hinden, "Virtual Router Redundancy Protocol (VRRP)," *Internet Engineering Task Force (IETF)*, Standard, Request for Comments 3768 (Apr. 2004).

Knight et al., "Virtual Router Redundancy Protocol," *IETF Network Working Group*, RFC 2338: 1-27 (Apr. 1998).

* cited by examiner

METHOD, SYSTEM AND ROUTER FOR COMMUNICATION BETWEEN IP DEVICES

CROSS-REFERENCE TO RELATED APPLICATIONS

This application is a continuation-in-part of International Patent Application No. PCT/CN2007/071054, filed Nov. 13, 2007, which claims priority to Chinese Patent Application No. 200610170031.7, filed Dec. 22, 2006, both of which are hereby incorporated by reference in their entirety.

FIELD OF THE TECHNOLOGY

The present invention relates to network communication technology, and more particularly to a method, a system, and a router for communication between Internet Protocol (IP) devices.

BACKGROUND

A local area network (LAN) communicates with an external network through a router. FIG. 1 is a schematic structural view of a system for a LAN to communicate with an external network through a default router in the conventional art.

As shown in FIG. 1, the system includes an Ethernet 100, a router 110 and an external network 120. A host A101, a host B102, and a host C103 are devices in the Ethernet 100. The host A101, host B102 and host C103 communicate respectively with the external network 120 through the router 110.

In the schematic structural view of the system shown in FIG. 1, all the hosts in the Ethernet 100 exchange information with the external network 120 through the default router 110. The advantage of this network structure lies in that the network configuration performed by the user is simplified. However, this network structure requires high reliability of the router 110. Once the router 110 fails, the devices in the Ethernet 100 are unable to communicate with the external network 120. Therefore, a backup router is often used to improve the reliability of the system.

The Virtual Router Redundancy Protocol (VRRP) is an error tolerance protocol defined by RFC 2338. The protocol combines a set of routers into a virtual router having the same virtual router IP address. The VRRP backup mechanism provides such a virtual router. When a physical router taking a routing task in the virtual router fails, another backup router substitutes the faulty router to implement the communication between the LAN and the external network.

FIG. 2 is a schematic structural view of the system for communication between a LAN and an external network through a virtual router in the conventional art. Comparing with the embodiment shown in FIG. 1, in addition to the Ethernet 100 and the external network 120, the system further includes a virtual router 230. The Ethernet 100 includes the host A101, the host B102, the host C103 and an internal router 104, and the virtual router 230 includes a router A231, a router B232 and a router C233.

The router A231, the router B232 and the router C233 form a virtual router 230, which is connected to the external network 120, and is further connected to the internal router 104 through the LAN. The address of the virtual router 230 is a virtual IP address, the addresses of the router A231, the router B232 and the router C233 are actual IP addresses, and the actual IP addresses and the virtual IP address are in the same network segment.

The FIG. 1 shows that, when the Ethernet 100 is considerably complicated, the internal router 104 is used to interconnect with the external network 120, that is, the Ethernet 100 communicates with the external network 120 through a router, and the internal router 104 exchanges route information with routers in the external network 120 by routing protocol. The main problem herein is that the routing protocol cannot perceive the virtual IP address of VRRP.

A specific process for implementing the communication between the internal router 104 and the virtual router 230 is described in the following based on the system shown in FIG. 2.

FIG. 3 is a flow chart of the communication between the internal router and the virtual router in the system shown in FIG. 2. The process includes the following.

In step 301, a priority of each physical router in the virtual router is set, and a master router is assigned.

In this step, the priorities of the routers A, B, and C in the virtual router are set according to the VRRP mechanism. The router with the highest priority is assigned as the master router, which is responsible for communication between the internal router and the external network. Here, the priority of the router A is set to be the highest, the router B is lower, and the priority of the router C is the lowest. Therefore, the router A is the master router; the routers B and C are backup routers in a ready and monitoring state. The actual IP addresses of the routers A, B and C are respectively set to be 10.1.1.1, 10.1.1.2 and 10.1.1.3.

In step 302, neighbor relation in the dynamic routing protocol is established between the internal router and the virtual router, and the routing information is exchanged.

In this step, the routers A, B and C use actual IP addresses respectively to establish the neighbor relation in the dynamic routing protocol with the internal router. The method for the physical routers to establish the neighbor relation in the dynamic routing protocol with the internal router is as follows: the internal router sends a dynamic routing protocol control packet to each physical router in the virtual router, in which the dynamic routing protocol control packet may be a Hello packet, a Link State Request (LSR) packet, a Link State Update (LSU) packet, a Link State Advertisement Acknowledgment (LSAck) packet, or other dynamic routing protocol control packets.

The dynamic routing protocol control packet may further include a data description (DD) packet.

The above contents only take OSPF as an example for explanation. The same problem also occurs to other IGP protocols, for example, the Intermediate System to Intermediate System (ISIS) protocol.

In step 303, when the master router fails, master router transiting is performed, and dynamic routing transiting of the internal router is performed.

The internal router uses the actual IP address 10.1.1.1 of the master router A as the IP address of next hop, and sends information to the router A according to the IP address of next hop. When the router A fails, the router B with the next higher priority is elected as the master router according to the VRRP mechanism. The internal router uses the actual IP address 10.1.1.2 of the router B as the IP address of the next hop, and sends information to the router B.

In this step, when the router A fails, the dynamic routing protocol transiting performed by the internal router is as follows: the internal router performs routing convergence, that is, sends the Hello packet to the router A; if no acknowledgment information is received in a specified period of time, the router A is considered to fail, and the neighbor list of the router A is deleted; then, a new routing calculation is performed, that is, the actual IP address 10.1.1.2 of the router B is used as the IP address of the next hop.

In the process of the transiting of the master router and the dynamic routing protocol transiting of the internal router, the following problems occur: when the router A fails, according to the VRRP mechanism, the failure can be detected rapidly, the router B is transited as the master router within a short time. However, the perception of the Hello packet to a neighboring failure is slow, and the convergence process of the dynamic routing protocol of the internal router and the new route calculation costs some time. Here, the internal router still considers the router A as the master router, and sends information to the router A, but the VRRP mechanism has already transited the router B as the master router. Therefore, the master router B cannot receive the information sent by the internal router. Because the transited master router B cannot receive the information sent by the internal router, the interval of the information sent from the internal router to the external network is quite long.

It is obvious that, in the conventional art, the internal router uses the actual IP address of the master router as the IP address of the next hop and sends the information that is to be sent to the external network to the master router. When the master router is transited, the transited master router cannot receive the information sent by the internal router rapidly. Therefore, according to the technical solutions in the conventional art, when the master router is transited, the interval when the internal router sends information to the external network is long.

SUMMARY

An embodiment of the present invention provides a method for communicating between IP devices, which can shorten an interval of communication between an internal router and a virtual router.

An embodiment of the present invention provides a system and a router for communicating between IP devices, which can shorten an interval of communication between an internal router and a virtual router.

In order to achieve the objective described above, an embodiment of the present invention provides a method for communicating between IP devices. The method includes: (1) receiving a dynamic routing protocol control packet sent by each actual physical router in a virtual router; (2) obtaining a virtual IP address according to the dynamic routing protocol control packet; and (3) using the virtual IP address as a next hop address and sending information to be sent to an external network to the virtual router.

In order to achieve the second objective described above, an embodiment of the present invention provides a system for communicating between IP devices. The system includes a virtual router and an internal router. The virtual router includes multiple actual physical routers. Each of the physical routers includes one master router and at least one backup router, in which (1) the internal router is adapted to receive a dynamic routing protocol control packet sent by each of the physical routers, obtain a virtual IP address of the virtual router according to the dynamic routing protocol control packet, use the virtual IP address as a next hop address, and send information to be sent to an external network to the virtual router; and (2) each of the physical routers is adapted to send the dynamic routing protocol control packet to the internal router and receive the information sent to the virtual router by the internal router.

An embodiment of the present invention further provides a router, which includes a control packet receiving and processing module and an information sending module, in which (1) the control packet receiving and processing module is adapted to receive a dynamic routing protocol control packet sent by each actual physical router in a virtual router, obtain a virtual IP address according to the dynamic routing protocol control packet, and send the virtual IP address to the information sending module; and (2) the information sending module is adapted to receive the virtual IP address, use the virtual IP address as a next hop address, and send information to be sent to an external network to the virtual router.

It can be seen from the technical solutions of the present invention that, the present invention provides a method, a system and a router for communication between IP devices. At first, the internal router obtains the virtual IP address of the virtual router, uses the obtained virtual IP address as the address of the next hop, and sends the information to the virtual router. When the master router is transited, the internal router still sends the information to be sent to the external network to the virtual router according to the virtual IP address. Here, the information is sent to the transited master router.

Through the technical solutions provided by the present invention, the internal router may send the information to be sent to the external network to the virtual router according to the virtual IP address. The information is sent to the master router. When the master router is transited, the internal router converting the dynamic routing protocol matches with the virtual router transiting the master router and the internal router still sends the information to be sent to the external network to the virtual router according to the virtual IP address. Here, the information is sent to the transited master router. Thus, it is assured that the time interval of the information sent to the virtual router by the internal router is short, so that the user substantially does not experience the occurrence of the information interruption.

DETAILED DESCRIPTION OF THE EMBODIMENTS

In order to make the objectives, technical solutions and advantages of the present invention more comprehensible, the present invention is described in detail in the following with reference to the accompanying drawings.

An embodiment of the present invention is as follows: an internal router obtains a virtual IP address of a virtual router, the obtained virtual IP address is used as an address of a next hop, information is sent to the virtual router, and the information is sent to a master router. The internal router converts the dynamic routing protocol. The virtual router transits the master router. When the master router is transited, the process of converting matches with the process of transiting, and the internal router sends the information to the transited virtual router according to the virtual IP address. When the master router is transited, the solutions provided by the present invention ensure that the master router in the virtual router is capable of receiving the information sent by the internal router continually.

Figure 1:
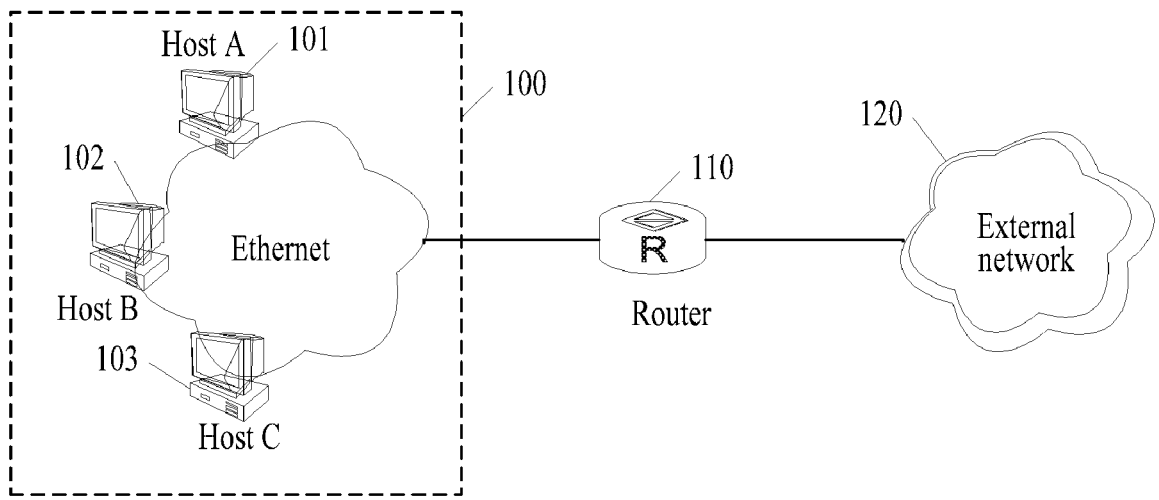
FIG. 1 is a schematic structural view of the system for a LAN to communicate with an external network through a default router in the conventional art.
Figure 2:
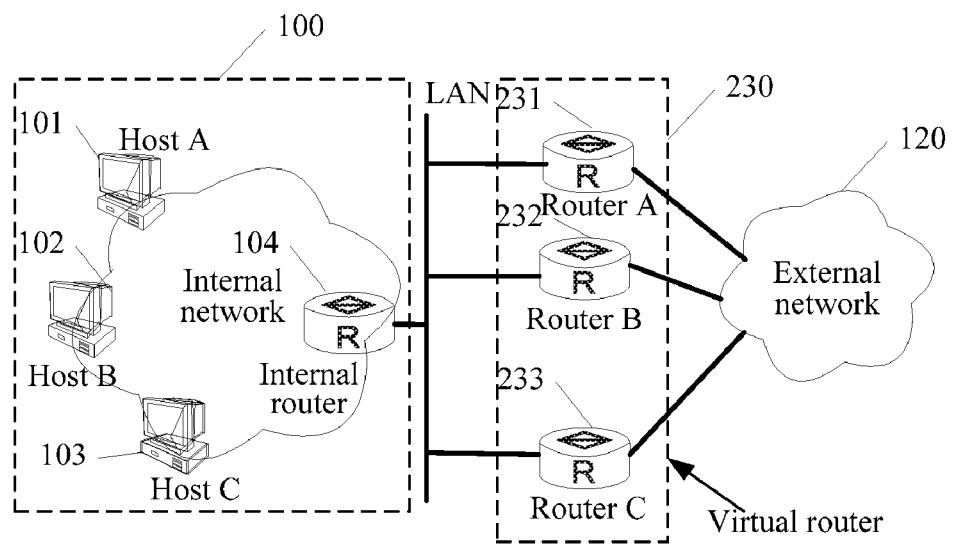
FIG. 2 is a schematic structural view of the system for a LAN to communicate with an external network through a virtual router in the conventional art.
Figure 3:
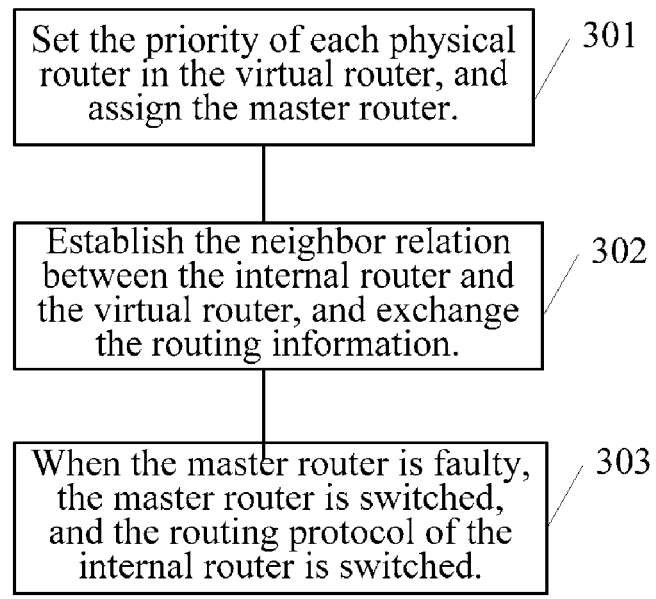
FIG. 3 is a flow chart of the communication between an internal router and the virtual router based on the system shown in FIG. 2.
Figure 4:
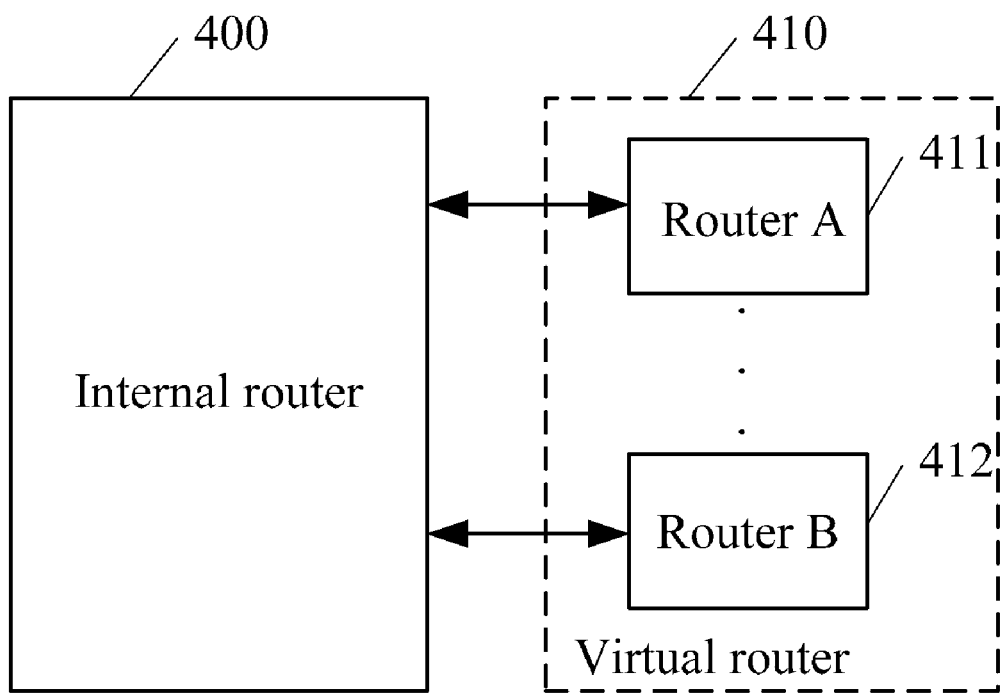
FIG. 4 is a schematic structural view of a system for communication between an internal router and a virtual router according to an embodiment of the present invention.

FIG. 4 is a schematic structural view of the system for communication between an internal router and a virtual router of the present invention.

As shown in FIG. 4, the system includes an internal router 400 and a virtual router 410. The virtual router 410 at least includes a router A411 and a router B412. The router with the highest priority is the master router. Here, the router A411 is assigned as the master router in advance, and the router B412 is a backup router.

The master router A411 is adapted to send a dynamic routing protocol control packet to the internal router 400, and is further adapted to receive the information sent to the virtual router 410 by the internal router 400.

The internal router 400 is adapted to receive the sent dynamic routing protocol control packet, obtain a virtual IP address of the virtual router according to the dynamic routing protocol control packet, use the obtained virtual IP address as the address of the next hop, and send the information to be sent to the external network to the virtual router 410, that is, the information is sent to the master router A411. When the master router is transited as the router B412, the internal router 400 sends the information to be sent to the external network to the virtual router 410 according to the virtual IP address, that is, the information is sent to the master router B412.

Similar to the master router A411, the backup router B412 also sends the dynamic routing protocol control packet to the internal router 400.

The internal router 400 uses an existing IGP protocol to perform route calculation according to the actual IP address in the control packet sent from the master router A411 and the backup router B412. It may select one actual IP address to generate the route, and update the actual IP address in the above route by using the corresponding virtual IP address according to correspondence relation of the virtual IP address and the actual IP address so as to obtain the virtual IP address in following route searching.

In the embodiment shown in FIG. 4, a system for implementing the technical solutions of the present invention is introduced. Then, the system is described in detail with reference to a specific embodiment in the following.

Figure 5:
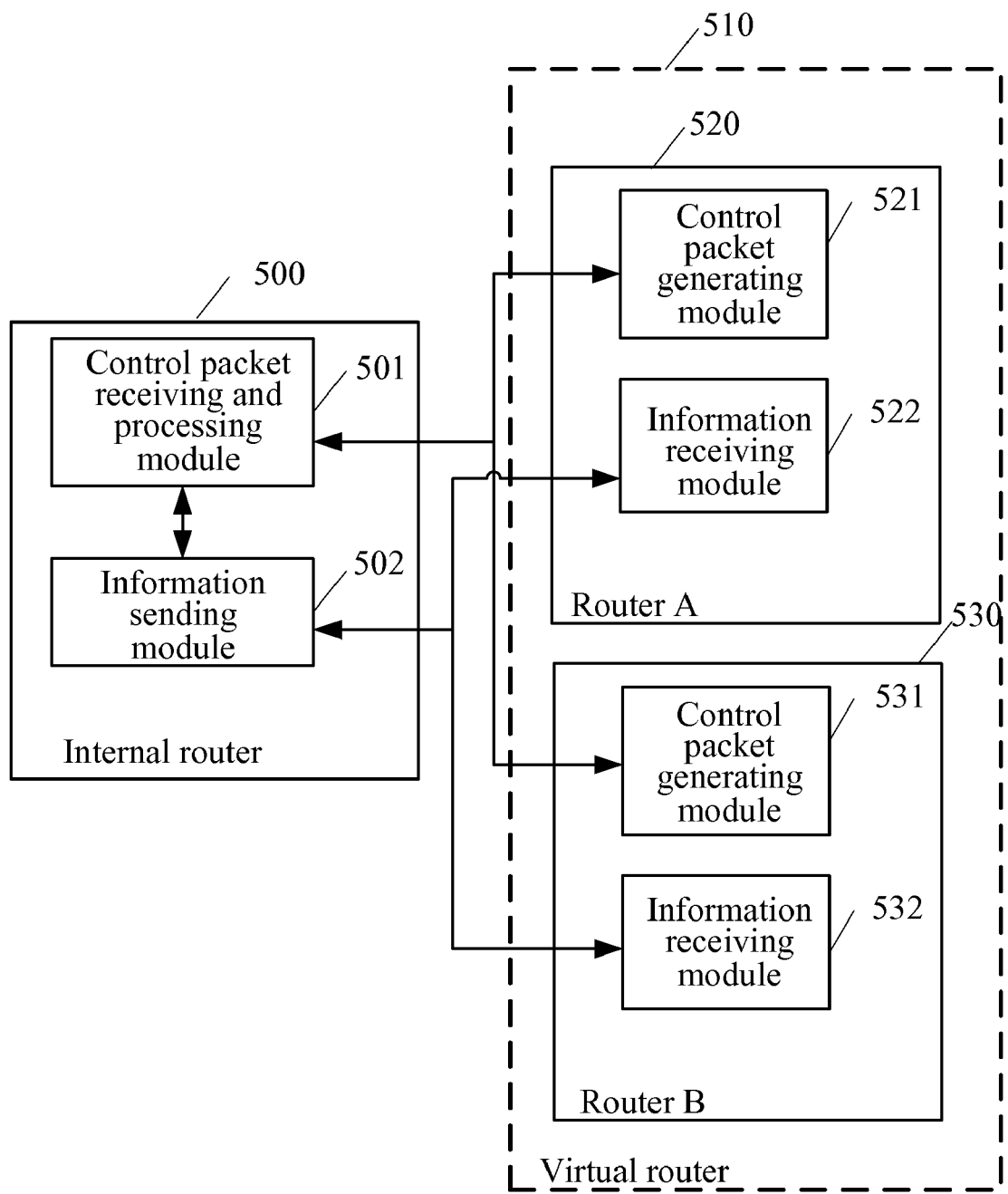
FIG. 5 is a schematic structural view of a system for communication between an internal router and a virtual router according to a first preferred embodiment of the present invention.

FIG. 5 is a schematic structural view of the system for communication between an internal router and a virtual router according to a first preferred embodiment of the present invention. As shown in FIG. 5, the system includes an internal router 500 and a virtual router 510. The virtual router 510 includes a router A520 and a router B530. The internal router 500 includes a control packet receiving and processing module 501 and an information sending module 502. The router A520 includes a control packet generating module 521 and an information receiving module 522. The module B530 includes a control packet generating module 531 and an information receiving module 532. Here, it is assumed that the router A520 is the master router, and the router B530 is the backup router, which is in a monitoring state.

The control packet generating module 521 is adapted to generate a dynamic routing protocol control packet carrying an actual IP address or a virtual IP address, and send the dynamic routing protocol control packet to the control packer receiving and processing module 501.

The control packet receiving and processing module 501 is adapted to receive the dynamic routing protocol control packet sent by the control packet generating module 521, obtain the virtual IP address according to the dynamic routing protocol control packet, and send the obtained virtual IP address to the information sending module 502.

The information sending module 502 is adapted to receive the virtual IP address sent by the control packet receiving and processing module 501, and send the information to be sent to the external network to the information receiving module 522 according to the virtual IP address.

The information receiving module 522 is adapted to receive the information sent by the information sending module 502.

The function of the control packet generating module 531 in the backup router B530 is the same as the control packet generating module 521 in the master router 520. Specifically, the control packet generating module 531 is also adapted to generate a dynamic routing protocol control packet carrying an actual IP address or a virtual IP address and send the dynamic routing protocol control packet to the control packer receiving and processing module 501. After receiving the dynamic routing protocol control packet from the backup router B530, the internal router 500 also establishes a neighbor relation in the dynamic routing protocol with the backup router B530. The specific processing action is the same as the process of the above-mentioned master router, which will not be repeated here.

After establishing the neighbor relation in the dynamic routing protocol, the information sending module 502 of the internal router 500 uses the virtual IP address as the IP address of next hop, sends the information to be sent to the external network only to the master router in the virtual router. In other words, in the internal router 500, only the information receiving module 522 currently located in the master router 520 can receive the information from the information sending module 502, that is, at a certain moment, only one information receiving module (i.e., the information receiving module 532 in the master router 520) is at work.

In the embodiment shown in FIG. 5, the internal structural view of the internal router 500, the router A520 and the router B530 in communication is described. According to the technical solutions provided by the present invention, in the embodiment shown in FIG. 6, the specific structures of the internal router 500, the router A520, and the router B530 are further introduced.

Figure 6:
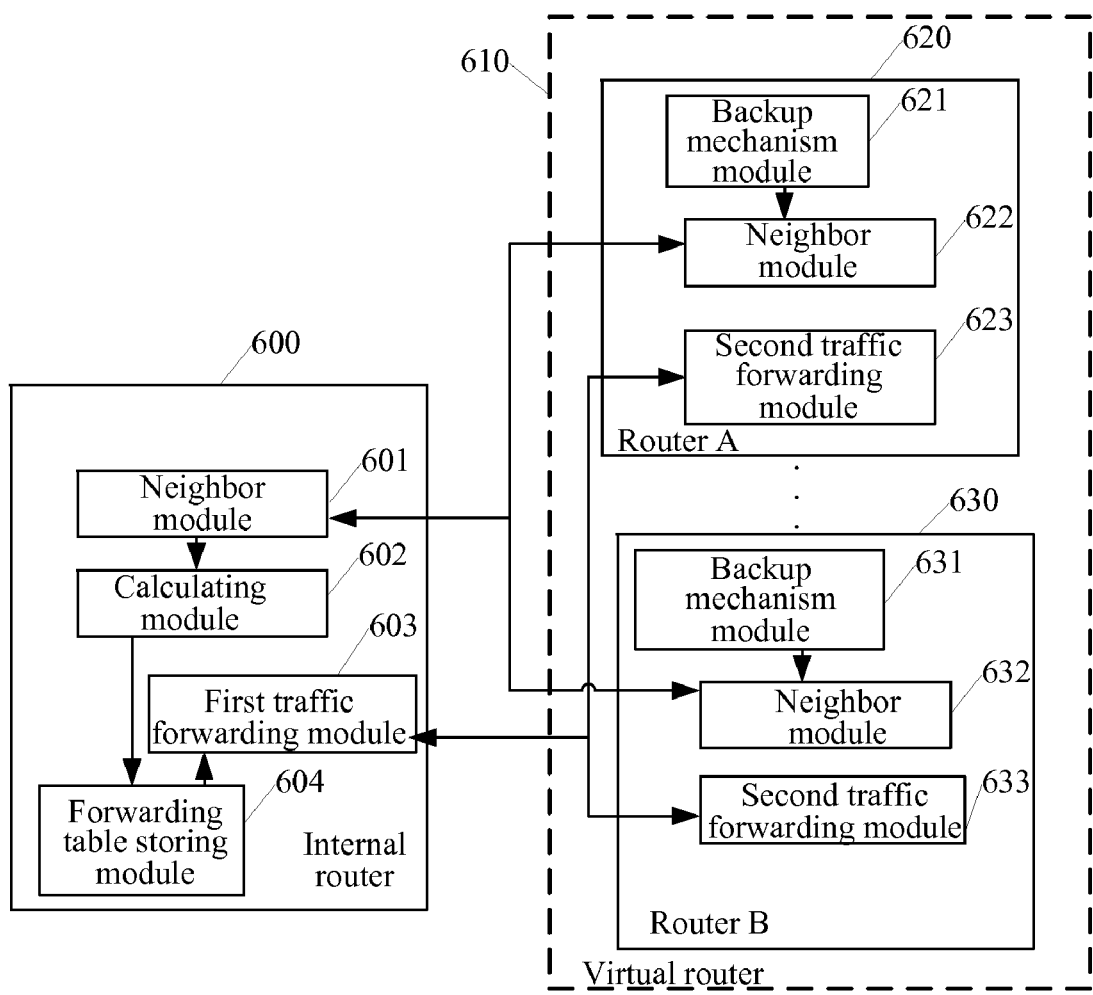
FIG. 6 is a schematic structural view of a system for communication between an internal router and a virtual router according to a second preferred embodiment of the present invention.

FIG. 6 is a schematic structural view of the system for communication between an internal router and a virtual router according to a second embodiment of the present invention. As shown in FIG. 6, the system includes an internal router 600 and a virtual router 610. The virtual router 610 specifically includes a router A620 and a router B630.

Corresponding to the embodiment shown in FIG. 5, the internal router 600 includes a control packet receiving and processing module and an information sending module. The router A620 and the router B630 both include a control packet generating module and an information receiving module.

The control packet receiving and processing module of the internal router 600 specifically includes a neighbor module 601 and a calculating module 602. The information sending module of the internal router 600 specifically includes a first traffic forwarding module 603 and a forwarding table storing module 604. The control packet generating module of the router A620 specifically includes a backup mechanism module 621 and a neighbor module 622. The control packet generating module of the router B630 specifically includes a backup mechanism module 631 and a neighbor module 632. The information receiving modules of the router A620 and the router B630 may be respectively a second traffic forwarding module 623 and a second traffic forwarding module 633.

Four implementations are introduced in this embodiment. The four implementations all include the neighbor module 601, the calculating module 602 and the neighbor module 622. In different implementations, these modules have different functions. To differentiate these modules, the modules are named as follows: in the first implementation, the neighbor module 601 is a first neighbor module 601, the calculating module 602 is a first calculating module 602, and the neighbor module 622 is a second neighbor module 622; in the second implementation, the neighbor module 601 is a third neighbor module 601, the calculating module 602 is a second calculating module 602, and the neighbor module 622 is a fourth neighbor module 622; in the third implementation, the neighbor module 601 is a fifth neighbor module 601, the calculating module 602 is a third calculating module 602, and the neighbor module 622 is a sixth neighbor module 622; in the fourth implementation, the neighbor module 601 is a seventh neighbor module 601, the calculating module 602 is a fourth calculating module 602, and the neighbor module 622 is an eighth neighbor module 622.

In this embodiment, the router A620 is firstly assigned as the master router, and the router B630 is the backup router having a next higher priority inferior to the router A620 and in a monitoring state. When the router A620 fails, the router B630 is transited as the master router. Corresponding to the processing of the communication between the internal router 500 and the virtual router 510 performed by the system shown in FIG. 5, the present invention provides four implementations, which will be described one by one in the following.

In the first implementation, the neighbor module 601 is the first neighbor module 601, the calculating module 602 is the first calculating module 602, and the neighbor module 622 is the second neighbor module 622.

The backup mechanism module 621 generates a binding relation of the actual IP address and the virtual IP address, and sends the binding relation information to the second neighbor module 622.

The second neighbor module 622 receives the binding relation information sent by the backup mechanism module 621, generates the dynamic routing protocol control packet carrying the actual IP address and Type 9 Link State Advertisement (LSA), carries the binding relation information of the actual IP address and the virtual IP address in the Type 9 LSA, and sends the dynamic routing protocol control packet to the first neighbor module 601.

The first neighbor module 601 is adapted to receive the dynamic routing protocol control packet and the Type 9 LSA sent by the second neighbor module 622, obtain the actual IP address of the master router A620 according to the dynamic routing protocol control packet, obtain the binding relation of the actual IP address and the virtual IP address from the Type 9 LSA, and send the actual IP address and the binding relation to the first calculating module 602.

The first calculating module 602 is adapted to receive the binding relation and the actual IP address sent by the first neighbor module 601, find out that the IP address of the next hop is the actual IP address to the master router A620 when performing route calculation according to the dynamic routing protocol, find the virtual IP address according to the binding relation by using the actual IP address, substitute the virtual IP address for the IP address of the next hop, and send the information about the next hop to the forwarding table storing module 604.

The first traffic forwarding module 603 looks up the forwarding table storing module 604, obtains the information about the next hop, and sends the information to be sent to the external network to the second traffic forwarding module 623 of the master router A620. When the master router A620 is transited as the router B630, the first traffic forwarding module 603 of the internal router 600 still uses the virtual IP address as the IP address of the next hop, and sends the information to be sent to the external network to the traffic forwarding module 633 of the router B630.

Similar to the backup mechanism module 621 of the master router A620, the backup mechanism module 631 of the backup router B630 also generates a binding relation of the actual IP address and the virtual IP address, and sends the binding relation information to the neighbor module 622. Similar to the neighbor module 622 of the master router A620, the neighbor module 632 of the backup router B630 also receives the binding relation information sent by the backup mechanism module 621, generates the dynamic routing protocol control packet carrying the actual IP address and Type 9 Link State Advertisement (LSA), and sends the dynamic routing protocol control packet to the neighbor module 601. After receiving the dynamic routing protocol control packet from the backup router B630, the internal router 600 also establishes a neighbor relation in the dynamic routing protocol with the backup router B630. The specific processing action is the same as the process of the above-mentioned master router, which will not be repeated here.

After establishing the neighbor relation in the dynamic routing protocol, the traffic forwarding module 603 of the internal router 600 uses the virtual IP address as the IP address of next hop, sends the information to be sent to the external network only to the master router in the virtual router. In other words, in the internal router 600, only the traffic forwarding module 623 currently located in the master router 620 is responsible for sending the traffic from the internal router 600, that is, at a certain moment, only one traffic forwarding module (i.e., the traffic forwarding module 623 in the master router 620) is at work.

In the first implementation, at first, the master router A620 carries the binding relation of the actual IP address and the virtual IP address in the Type 9 LSA sent to the internal router 600. The internal router 600 obtains the actual IP address of the master router A620 by establishing a neighbor relation in the dynamic routing protocol with the master router A620 in advance. When performing route calculation, the first calculating module 602 of the internal router 600 finds out that the IP address of the next hop is the actual IP address of the master router A620. Here, the first traffic forwarding module 603 utilizes the actual IP address to find the virtual IP address according to the binding relation, uses the virtual IP address as the IP address of the next hop, and sends the information to be sent to the external network to the virtual router 610. When the master router is transited as the router B630, while the time for router transiting of the internal router 600 is long, during the period, the internal router 600 still sends the information to be sent to the external network to the virtual router 610 according to the virtual IP address, and the virtual router 610 associates the information with the master router B630 dynamically.

Since the functions of the backup mechanism module 631 and the neighbor module 632 of the backup router B630 are the same as the functions of the backup mechanism module 621 and the neighbor module 622 of the master router A620, for the sake of text conciseness of the present embodiment, only the master router A620 is taken as an example for explaining as follows.

Taking the maser router A620 for example, the process for associating the information sent to the virtual router 610 with the master router A620 dynamically is described. The internal router 600 sends a packet requesting the Media Access Control (MAC) to the virtual router 610 according to the virtual IP address. After receiving the packet requesting the MAC, the master router A620 carries its own MAC information in response information to the packet. Alternatively, the correspondence relation of the virtual IP address and the virtual MAC is set on the master router A620 in advance; after receiving the packet carrying the virtual IP address, the master router A620 carries the virtual MAC information in the response information of the request packet. After receiving the MAC information or virtual MAC information of the master router A620, the internal router 600 sends the information to be sent to the external network to the master router A620. The corresponding operation of the master router B630 is completely the same as that of the master router A620.

In the second implementation, the neighbor module 601 mentioned is the third neighbor module 601, the neighbor module 622 is the fourth neighbor module 622, and the calculating module 602 is the second calculating module 602.

The backup mechanism module 621 of the router A620 generates the binding relation of the actual IP address and the virtual IP address, and sends the binding relation information to the fourth neighbor module 622.

The fourth neighbor module 622 receives the binding relation information sent by the backup mechanism module 621, generates a dynamic routing protocol control packet in which a link data is the actual IP address. The dynamic routing protocol control packet may be the Open Shortest Path First (OSPF) Router LSA. The virtual IP address is substituted for the link data in the OSPF Router LSA. The OSPF Router LSA carrying the virtual IP address is sent to the third neighbor module 601.

The third neighbor module 601 is adapted to receive the OSPF Router LSA sent by the fourth neighbor module 622, obtain the virtual IP address according the link data in the OSPF Router LSA, and send the virtual IP address to the second calculating module 602.

The second calculating module 602 is adapted to receive the virtual IP address sent by the third neighbor module 601, find out that the IP address of the next hop is the virtual IP address according to the dynamic routing protocol when performing the route calculation, and send the information of the next hop to the forwarding table storing module 604.

The first traffic forwarding module 603 looks up the forwarding table storing module 604, and obtains the information of the next hop, and sends the information to be sent to the external network to the second traffic forwarding module 623 of the master router A620 according to the information about the next hop. When the master router A620 is transited as the master router B630, the first traffic forwarding module 603 of the internal router 600 still uses the virtual IP address as the next hop, and sends the information to be sent to the external network to the traffic forwarding module 633 of the master router B630.

In the second implementation, the master router A620 and the backup router B630 carry the virtual IP address in the dynamic routing protocol control packet sent to the internal router 600 by extending the dynamic routing protocol. When performing route calculation according to the dynamic routing protocol, the internal router 600 finds out that the IP address of the next hop is the virtual IP address, and sends the information to be sent to the external network to the virtual router 610. After the master router is transited as the router B630, although the time for router transiting of the master router B630 performed by the internal router 600 is long, in this time period, the internal router 600 still sends the information to be sent to the external network to the virtual router 610 according to the virtual IP address, that is, sends the information to the master router B630. The method for associating the information sent to the virtual router 610 with the master router dynamically is the same as the corresponding method in the first implementation.

In the third implementation, the neighbor module 601 is the fifth neighbor module 601, the neighbor module 622 is the sixth neighbor module 622, and the calculating module 602 is the third calculating module 602.

The sixth neighbor module 622 in the master router A620 carries the virtual IP address in the dynamic routing protocol control packet, and sends the dynamic routing protocol control packet to the fifth neighbor module 601 of the internal router 600.

The fifth neighbor module 601 is adapted to receive the dynamic routing protocol control packet sent by the sixth neighbor module 622, obtain the virtual IP address according to the dynamic routing protocol control packet, and send the virtual IP address to the third calculating module 602.

The third calculating module 602 is adapted to receive the virtual IP address sent by the fifth neighbor module 601, find out that the IP address of the next hop is the virtual IP address according to the dynamic routing protocol when performing route calculation, and send the information of the next hop to the forwarding table storing module 604.

The first traffic forwarding module 603 looks up the forwarding table storing module 604, obtain the information of the next hop, sends the information to be sent to the external network to the second traffic forwarding module 623 of the master router A620. When the master router is transited as the master router B630, the first traffic forwarding module 603 still uses the virtual IP address as the next hop, and sends the information to be sent to the external network to the traffic forwarding module 633 of the master router B630.

Similar to the neighbor module 622 in the master router A620, the neighbor module 632 in the backup router B630 also carries the virtual IP address in the dynamic routing protocol control packet, and sends the dynamic routing protocol control packet to the neighbor module 601 of the internal router 600. After receiving the dynamic routing protocol control packet from the backup router B630, the internal router 600 establishes the neighbor relation in the dynamic routing protocol with the backup router B630. The specific processing action is the same as the process of the above-mentioned master router, which will not be repeated here.

Since the action of the backup router B630 is the same as that of the master router A620, only the master router A620 is taken as an example for explaining as follows.

In the third implementation described above, because the binding relation of the virtual IP and the actual IP does not need to be carried in the information sent to the internal router 600 by the master router A620, the backup mechanism module 621 is not used in this implementation. In the third implementation, the virtual IP address is used to establish the neighbor relation in the dynamic routing protocol between the internal router 600 and the master router A620, when performing route calculation, the internal router 600 finds out that the IP address of the next hop is the virtual IP address, and sends the information to be sent to the external network to the virtual router 610 according to the virtual IP address, that is, the information is sent to the router A620. When the master router is transited as the router B630, although the time for the router transiting of the internal router 600 is long, in this time period, the internal router 600 still sends the information to be sent to the external network to the virtual router 610 according to the virtual IP address, that is, the information is sent to the master router B630. The method for associating the information sent to the virtual router 610 with the master router is the same as the corresponding method in the first implementation.

The difference between the third implementation and the second one is as follows: in the second implementation, the fourth neighbor module 622 substitutes the virtual IP address for the link data in the OSPF Router LSA according to the actual IP address and the binding relation of the actual IP address and the virtual IP address, and sends the substituted OSPF Router LSA to the third neighbor module 601; the third neighbor module 601 obtains the virtual IP address according to the link data in the OSPF Router LSA. In the third implementation, the sixth neighbor module 622 does not need to set the virtual IP address in the place where the IP address may be set in the dynamic routing protocol control packet according to the binding relation of the actual IP address and the virtual IP address, but sends the dynamic routing protocol control packet to the fifth neighbor module 601, and the fifth neighbor module 601 obtains the virtual IP address according to the dynamic routing protocol control packet.

In the fourth implementation, the neighbor module 601 mentioned here is the seventh neighbor module 601, the neighbor module 622 is the eighth neighbor module 622, and the calculating module 602 is the fourth calculating module 602. The internal router 600 further includes a configuring module.

The eighth neighbor module 622 generates the dynamic routing protocol control packet carrying the actual IP address, and sends the dynamic routing protocol control packet to the seventh neighbor module 601.

The seventh neighbor module 601 is adapted to receive the dynamic routing protocol control packet sent by the eighth neighbor module 622, obtain the actual IP address according to the dynamic routing protocol control packet, and send the actual IP address to the fourth calculating module 602.

The configuring module of the internal router 600 is adapted to configure the correspondence relation of the virtual IP address and the actual IP address, and send the correspondence relation to the fourth calculating module 602.

The fourth calculating module 602 is adapted to receive the actual IP address sent by the seventh neighbor module 601 and the correspondence relation sent by the configuring module, find out that the IP address of the next hop is the actual IP address of the master router A620 according to the dynamic routing protocol when performing route calculation, find the virtual IP address according to the correspondence relation by using the virtual IP address, substitute the virtual IP address for the IP address of the next hop, and send the information of the next hop to the forwarding table storing module 604.

The first traffic forwarding module 603 of the internal router 600 looks up the forwarding table storing module 604, obtains the information of the next hop, and sends the information to be sent to the external network to the second traffic forwarding module 623 of the master router A620. When the master router is transited as the master router B630, the first traffic forwarding module 603 of the internal router 600 still uses the virtual IP address as the next hop, and sends the information to be sent to the external network to the traffic forwarding module 633 of the master router B630.

Similar to the neighbor module 622 in the master router A620, the neighbor module 632 in the backup router B630 also generates the dynamic routing protocol control packet carrying the actual IP address, and sends the dynamic routing protocol control packet to the neighbor module 601. After receiving the dynamic routing protocol control packet from the backup router B630, the internal router 600 establishes the neighbor relation in the dynamic routing protocol with the backup router B630. The specific processing action is the same as the process of the above-mentioned master router, which will not be repeated here.

In the fourth implementation, different from the first implementation, the master router A620 does not include the backup mechanism module 621. Because the correspondence relation of the actual IP address and the virtual IP address needs to be configured on the internal router 600, the configuring module is disposed in the internal router 600. In the fourth implementation, the correspondence relation of the virtual IP address and the actual IP address is established on the internal router 600 by extending the dynamic routing protocol of the internal router 600. The internal router 600 obtains the actual IP address of the master router A620 according to the neighbor relation in the dynamic routing protocol established with the master router A620 in advance. When performing route calculation, the internal router 600 finds out that the IP address of the next hop is the actual IP address of the master router A620, finds the virtual IP address according to the correspondence relation of the actual IP address and the virtual IP address by using the actual IP address, sets the IP address of the next hop to the virtual IP address, and sends the information to be sent to the external network to the virtual router 610. When the master router is transited as the router B630, although the time for the router transiting of the internal router 600 is long, in this time period, the internal router 600 still sends the information to be sent to the external network to the virtual router 610 according to the virtual IP address, that is, the information is sent to the master router B630. The method for associating the information sent to the virtual router 610 with the master router dynamically is the same as the corresponding method in the first implementation.

In the embodiment shown in FIG. 6, in this embodiment, the dynamic routing protocol control packet may be a Hello packet, a Link State Request (LSR) packet, a Link State Update (LSU) packet, a Link State Advertisement Acknowledgment (LSAck) packet, or other dynamic routing protocol control packets. The backup mechanism module may be a VRRP module. The neighbor module 601, the neighbor module 622 and the neighbor module 632 may be an OSPF neighbor module. The calculating module 602 may be an OSPF calculating module, that is, a module performing route calculation according to OSPF rules. In this embodiment, the PSPF dynamic routing protocol is taken for example to describe the present invention. Except for the first implementation, the second implementation, the third implementation, and the fourth implementation may further be applicable to other dynamic routing protocols using the same principles.

In the embodiments shown in FIGS. 4, 5 and 6, the internal router and the virtual router are taken as an example to describe the system for the communication between IP devices. Other IP devices with the same principle as the router have similar structure with the router in the above embodiments, for example, firewall, gateway, and switch.

The method for the uplink communication between the internal router and the virtual router is described in the following with specific embodiments.

Figure 7:
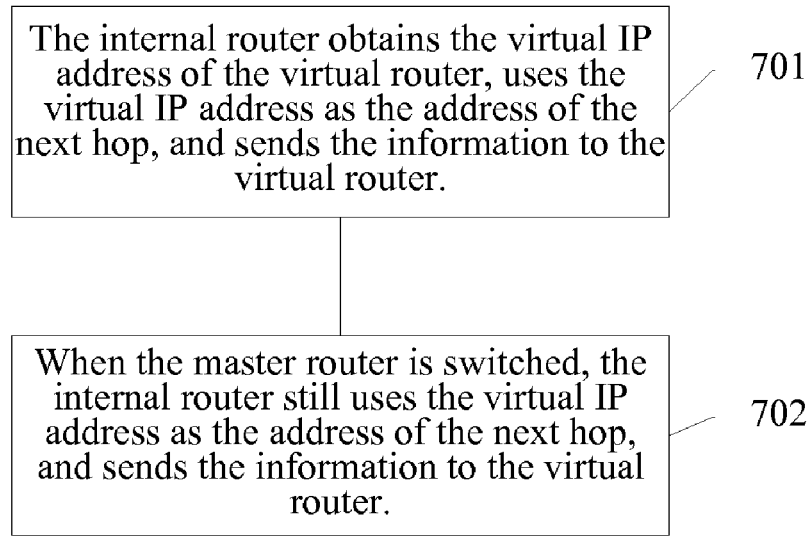
FIG. 7 is a flow chart of a method for communication between an internal router and a virtual router according to an embodiment of the present invention.

FIG. 7 is a flow chart of the method for communication between the internal router and the virtual router according to the present invention. As shown in FIG. 7, the method is as follows:

In step 701, the internal router obtains the virtual IP address of the virtual router, uses the obtained virtual IP address as the address of the next hop, and sends the information to be sent to the external network to the virtual router.

In step 702, when the master router is transited, the internal router still uses the virtual IP address as the address of the next hop, and sends the information to be sent to the external network to the virtual router.

In can be seen from the embodiment shown in FIG. 7 that, the internal router sends the information to the virtual router by using the virtual IP address of the virtual router as the IP address of the next hop in route calculation. The specific operation of the VRRP backup mechanism using different modes to realize the solutions of the present invention is described as below.

Figure 8:
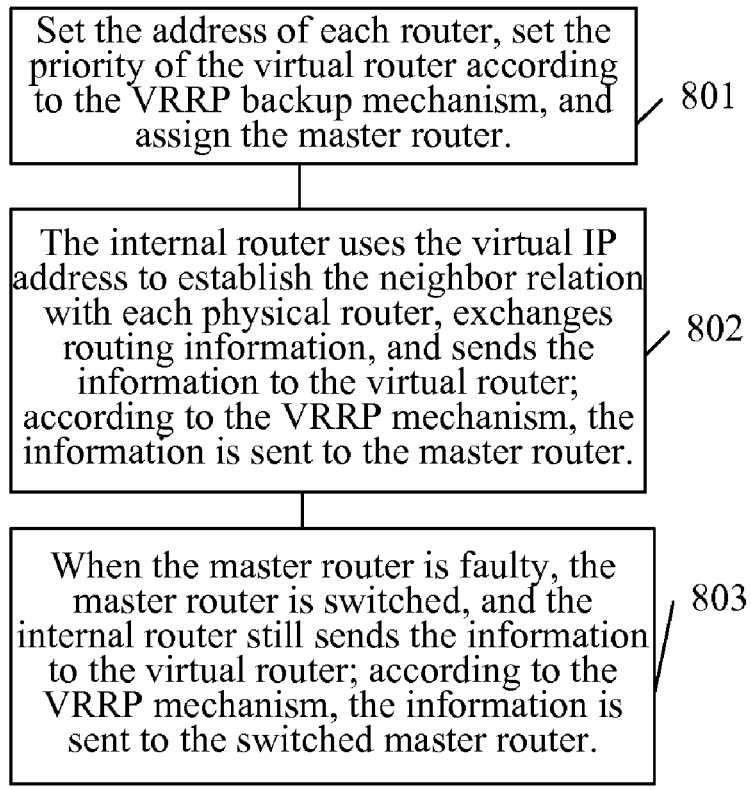
FIG. 8 is a flow chart of a method for communication between an internal router and a virtual router according to a third preferred embodiment of the present invention.

FIG. 8 is a flow chart of the method for communication between the internal router and the virtual router according to a third preferred embodiment of the present invention. The details are as follows.

In step 801, the address of each router is set, the priority of each physical router in the virtual router is set according to the VRRP backup mechanism, and the master router is assigned.

In this step, the address of the internal router is set to be 10.1.1.4, and the address of the virtual router is set to be 10.1.1.5. For example, the virtual router includes three actual physical routers A, B and C. The addresses of these routers are set respectively to 10.1.1.1, 10.1.1.1 and 10.1.1.3. The priority of each physical router is set. In this embodiment, the priority of the router A is set to be the highest, the priority of the router B is set to be the next higher inferior to that of the router A, and the priority of the router C is the lowest. According to the principle that the router with the highest priority is the master router, the router A is assigned as the master router, the routers B and C are backup routers in a monitoring state.

In step 802, the internal router uses the virtual IP address to establish the neighbor relation in the dynamic routing protocol with each physical router, exchanges routing information, and sends the information to be sent to the external network to the virtual router; according to the VRRP mechanism, the information is sent to the master router.

In this step, the internal router establishes the neighbor relation in the dynamic routing protocol with the routers A, B and C by exchanging the dynamic routing protocol control packet. The dynamic routing protocol control packet is the same as the conventional art, and will not be discussed here. The difference is as follows. In this embodiment, the routers A, B and C use the virtual IP address 10.1.1.5 of the virtual router to establish the neighbor relation in the dynamic routing protocol with the internal router, and exchange routing information. The dynamic routing protocol control packet referred here may be a Hello packet, a Link State Request (LSR) packet, a Link State Update (LSU) packet, a Link State Advertisement (LSA) packet, or another dynamic routing protocol control packet.

After the internal router establishes the neighbor relation in the dynamic routing protocol with the master router in the virtual router, when performing route calculation according the dynamic routing protocol, the internal router uses the virtual IP address 10.1.1.5 as the IP address of the next hop according to the routing information sent by the neighbor router. The internal router sends the information to be sent to the external network to the virtual router. According to the VRRP mechanism, the information is associated with the master router A dynamically.

According to the VRRP mechanism, the method for associating the information sent to the virtual router with the actual physical master router A dynamically is as follows: the internal router sends the packet requesting MAC to the virtual router according to the virtual IP address 10.1.1.5; at this time, the router A is the master router; after receiving the packet, the router A sends its own MAC information to the internal router through a response to the request. Alternatively, the correspondence relation of the virtual IP address and the virtual MAC is set on the master router A in advance; after receiving the packet carrying the virtual IP address, the master router A carries the virtual MAC information in the response information of the request packet. After receiving the MAC information or virtual MAC information of the master router A, the internal router sends the information to be sent to the external network to the master router A.

In step 803, when the master router fails, the master router is transited, the internal router still sends the information to the virtual router. According to the VRRP mechanism, the information is sent to the transited master router.

In this step, when the master router A fails, the router B with the next higher priority inferior to that of the router A in the virtual router is transited as the master router according to the VRRP mechanism. Here, the internal router still uses the virtual IP address as the IP address of the next hop according to route calculation, and sends the information to be sent to the external network to the virtual router. The information is sent to the master router B according to the VRRP mechanism. According to the VRRP mechanism, the method for mapping the information sent to the virtual router to the actual physical master router B dynamically is the same as the corresponding method in the step 802, and will not be described again here.

The embodiment shown in FIG. 8 describes how each physical router in the virtual router uses the virtual IP address to establish the neighbor relation in the dynamic routing protocol with the internal router, uses the virtual IP address 10.1.1.5 as the IP address of the next hop, and sends the information to be sent to the external network to the virtual router. When the master router is transited, it is ensured that the transited master router can receive the information sent by the internal router in a short time. In the embodiment shown in FIG. 9, another mode for the internal network to use the virtual IP address 10.1.1.5 as the IP address of the next hop and send the information to be sent to the external network to the virtual router is described.

Figure 9:
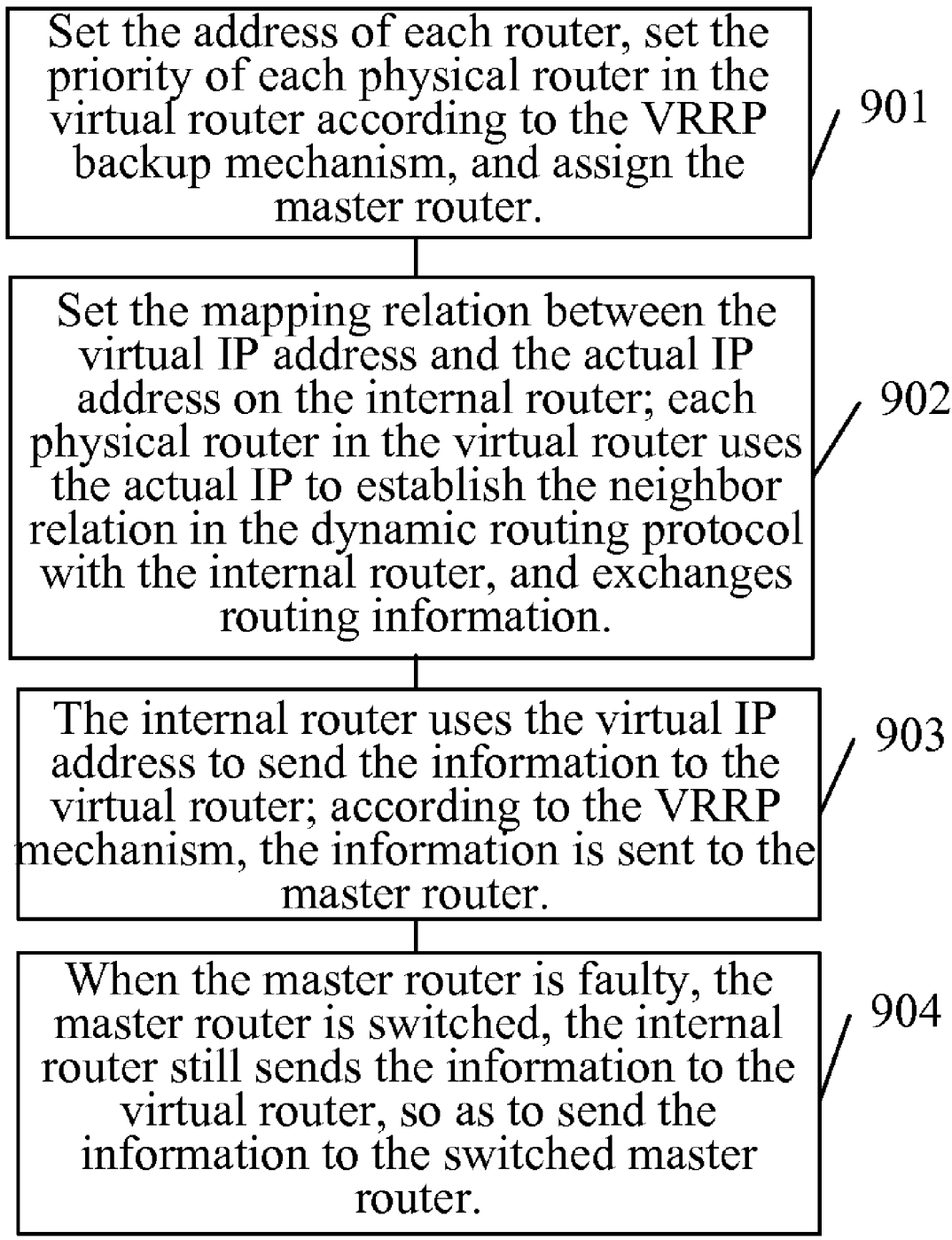
FIG. 9 is a flow chart of a method for communication between an internal router and a virtual router according to a fourth preferred embodiment of the present invention.

FIG. 9 is a flow chart of the method for communication between the internal router and the virtual router according to the fourth preferred embodiment of the present invention. The process is as follows:

In step 901, the address of each router is set, the priority of each physical router in the virtual router is set according to the VRRP backup mechanism, and the master router is assigned.

The specific operation of this step is completely the same as that of step 801, and will not be described again here.

In step 902, a mapping relation between the actual IP address and the virtual IP address is set on the internal router, and each physical router in the virtual router uses the actual IP address to establish the neighbor relation in the dynamic routing protocol with the internal router, and to exchange the routing information.

In this step, the user establishes the correspondence relation table between the actual IP address and the virtual IP address manually, and assigns the mapping relation between the actual IP address and the virtual IP address in this table. The routers B, C and the master router A use the actual IP address to establish the neighbor relation in the dynamic routing protocol with the internal router, and exchange the routing information. The method for establishing the neighbor relation in the dynamic routing protocol and exchanging the routing information is completely the same as the conventional art, and will not be described again here.

In step 903, the internal router uses the virtual IP address to send the information to the virtual router. According to the VRRP mechanism, the information is sent to the master router.

In this step, because the master router A uses the actual IP address 10.1.1.1 to establish the neighbor relation in the dynamic routing protocol with the internal router, according to the dynamic routing protocol, when performing route calculation, the internal router finds out that the IP address of the next hop is the actual IP address 10.1.1.1. The internal router finds the virtual IP address 10.1.1.5 corresponding to the actual IP address according to the correspondence relation of the virtual IP and the actual IP set in step 802. The internal router uses the virtual IP address 10.1.1.5 as the IP address of the next hop, and sends the information to be sent to the external network to the virtual router. According to the VRRP mechanism, the information is sent to the master router A. According to the VRRP mechanism, the method for associating the information sent to the virtual router with the physical master router A dynamically is the same as the corresponding method in step 802, and will not be described again here.

In step 904, when the master router fails, the master router is transited, the internal router sends the information to the virtual router. According to the VRRP mechanism, the information is sent to the transited master router.

In this step, when the master router A fails, according to the VRRP mechanism, the router B with the next higher priority inferior to that of the router A in the virtual router is transited as the master router. The internal router still sends the information to be sent to the external network to the virtual router according to the virtual IP address 10.1.1.5. According to the VRRP mechanism, the information is sent to the transited master router B. The method for associating the information sent to the virtual router with the physical master router B dynamically is the same as the corresponding method in step 802, and will not be described again here.

In the embodiment shown in FIG. 9, the correspondence relation of the actual IP address and the virtual IP address is set manually on the internal router. The internal router finds the virtual IP address correspondingly according to the actual IP address obtained from the routing information, sends the information to be sent to the external network to the virtual router according to the virtual IP address.

Figure 10:
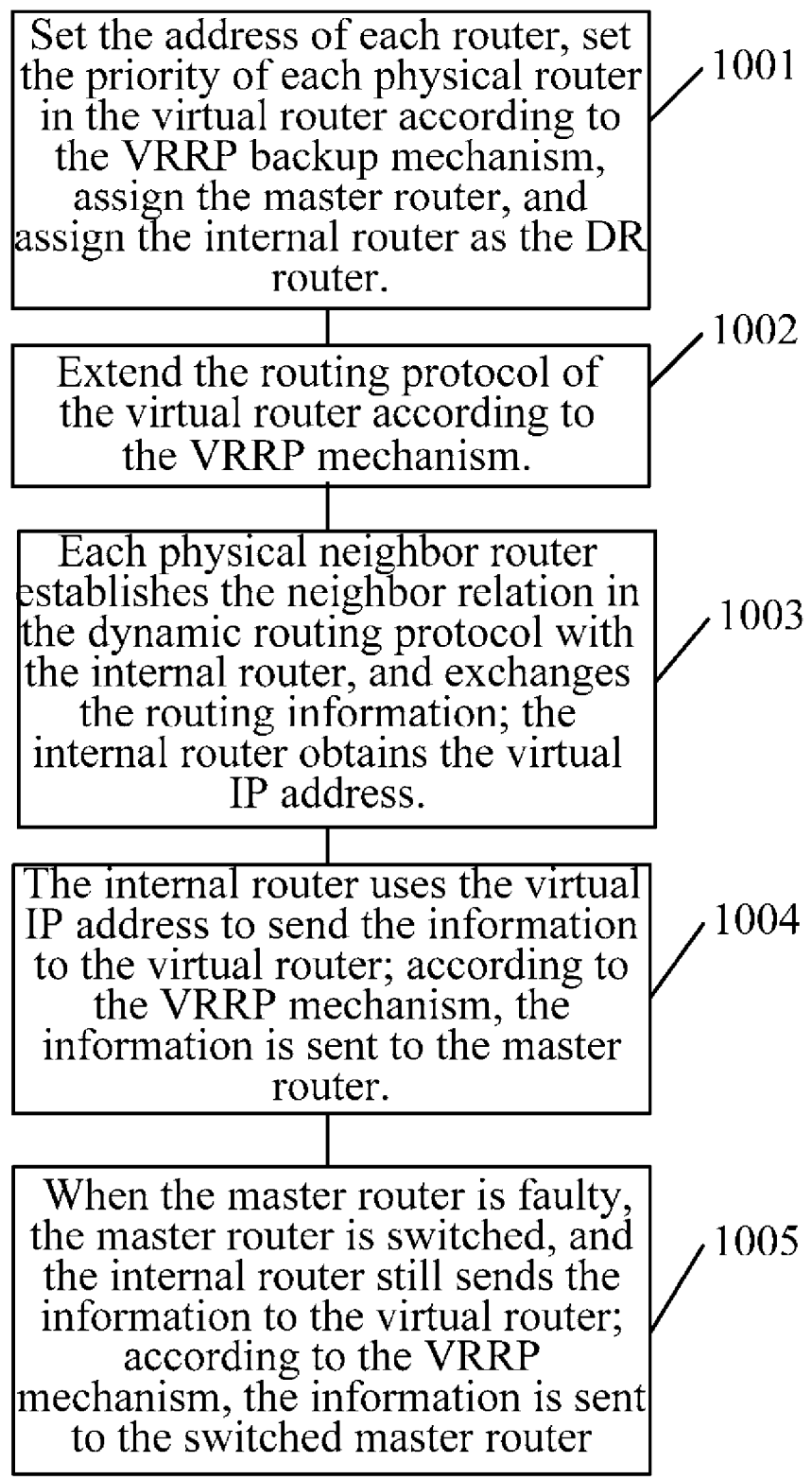
FIG. 10 is a flow chart of a method for communication between an internal router and a virtual router according to a fifth preferred embodiment of the present invention.

In the embodiment shown in FIG. 10, it is explained that, by extending the dynamic routing protocol of the master router in the virtual router, the internal router obtains the virtual IP address according to the extended dynamic routing protocol and sends the information to be sent to the external network to the virtual router according to the virtual IP address.

FIG. 10 is a flow chart of the method for communication between the internal router and the virtual router according to a fifth embodiment of the present invention. The process is as follows:

In step 1001, the address of each router is set, the priority of each physical router in the virtual router is set according to the VRRP backup mechanism, and the master router and the designated router (DR) are assigned.

The operation method in this step is completely the same as step 801, and will not be described again here. In this step, the internal router is assigned as the DR router, and the internal router takes the place of other devices in the LAN to communicate with the external network.

In step 1002, according to the VRRP mechanism, the dynamic routing protocol of the master router in the virtual router is extended.

In this embodiment, taking the OSPF dynamic routing protocol for example, the method for extending the dynamic routing protocol of the virtual router according to the VRRP mechanism is described. Table 1 is a schematic view of the format of the OSPF Router LSA.

TABLE 1

| 0 | | 15 16 | 23 24 | 31 |
|---|---|---|---|---|
| LS life | | | Option | LS type = 1 |
| Link state ID | | | | |
| Advertising router | | | | |
| LS Serial Number | | | | |
| LS checksum | | | Length | |
| 00000 V E B | | 0 | Link number | |
| Link ID | | | | |
| Link data | | | | |
| Type | | TOS number | TOS measurement | |
| TOS | | 0 | Measurement | |

In the conventional art, the link data is set to be the actual IP address. In this embodiment, the link ID is the IP address of the DR router, that is, the address 10.1.1.4 of the internal router. The link data is replaced by the virtual IP address 10.1.1.5. The method for setting other values in the table 1 is the same as the conventional art, and will not be described again here.

In step 1003, each physical router establishes the neighbor relation in the dynamic routing protocol with the internal router, and exchanges the neighbor information, and the internal router obtains the virtual IP address.

The specific operation of this step is completely the same as the method for the neighbor router to use the actual IP address to establish the neighbor relation in the dynamic routing protocol with the internal router and to exchange the routing information in the step 902.

After receiving the OSPF Router LSA sent by the neighbor router, the internal router obtains the virtual IP address 10.1.1.5 of the virtual router according the link data in the LSA.

In step 1004, the internal router uses the virtual IP address and sends the information to the virtual router. According to the VRRP mechanism, the information is sent to the master router A.

The specific operation of this step is completely the same as the step 903 and will not be described again here.

In step 1005, when the master router fails, the master router is transited, the internal router still sends the information to the virtual router. According to the VRRP mechanism, the information is sent to the transited master router.

The specific operation of this step is completely the same as that of step 904.

In the embodiment shown in FIG. 10, according to the VRRP mechanism, the dynamic routing protocol of the physical routers in the virtual router is extended, the link data in the OSPF Router LSA is set to be the virtual IP address 10.1.1.5, and the dynamic routing protocol of the internal router does not need to be extended. After receiving the OSPF Router LSA sent by the neighbor router, the internal router obtains the virtual IP address 10.1.1.5, uses the virtual IP address 10.1.1.5 as the IP address of the next hop, and sends the information to be sent to the external network to the virtual router.

Figure 11:
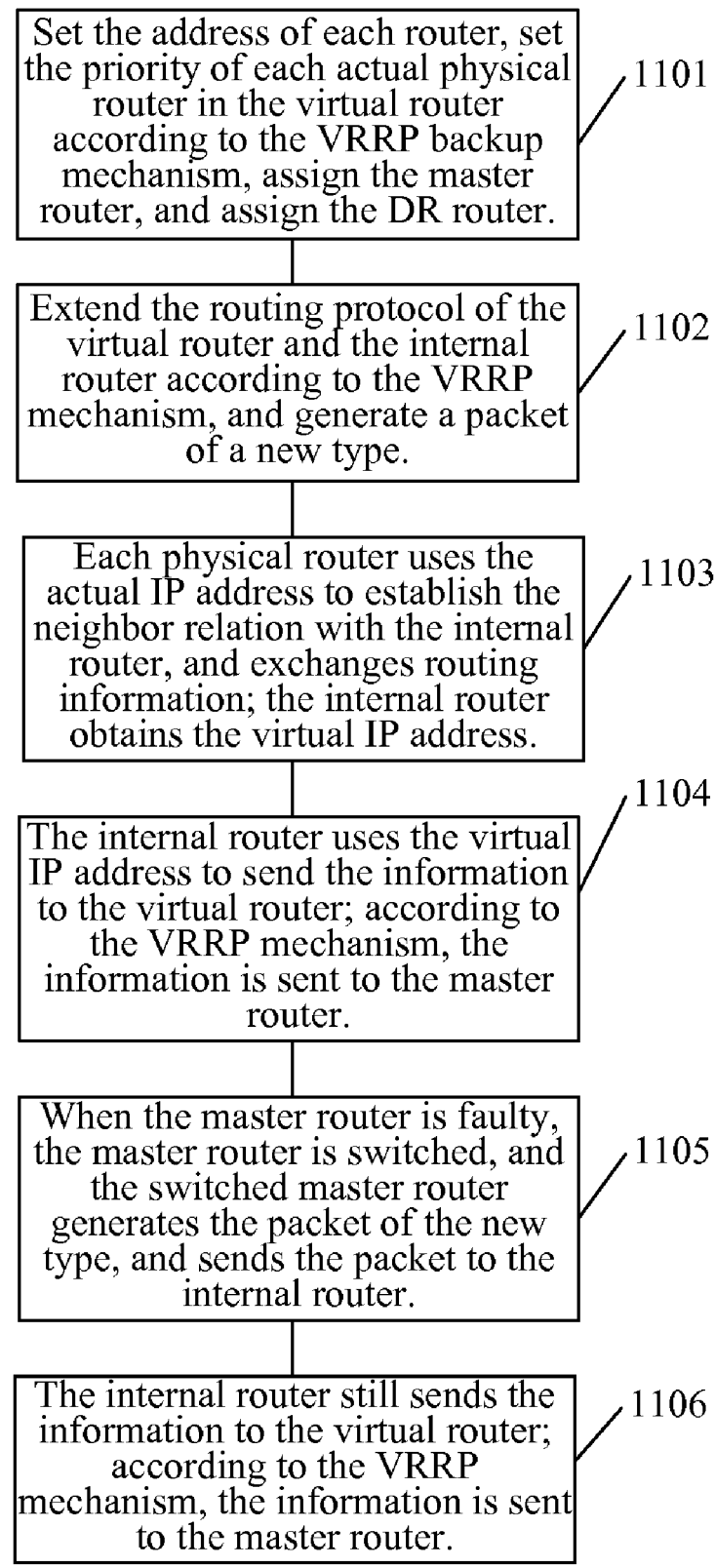
FIG. 11 is a flow chart of a method for communication between an internal router and a virtual router according to a sixth preferred embodiment of the present invention.

In the embodiment shown in FIG. 11, it is explained that, by extending the dynamic routing protocol of the virtual router and the internal router, the internal router obtains the virtual IP address according to the extended dynamic routing protocol and sends the information to be sent to the external network to the virtual router according to the virtual IP address.

FIG. 11 is a flow chart of the method for communication between the internal router and the virtual router according to a sixth preferred embodiment of the present invention. The process is as follows.

In step 1101, the address of each router is set, the priority of each physical router in the virtual router is set according to the VRRP backup mechanism, and the master router and the DR router are assigned.

The operation of this step is the same as step 1001, and will not be described again here. In this step, the internal router is assigned as the DR router, and the internal router takes the place of other devices in the LAN to communicate with the external network.

In step 1102, according to the VRRP mechanism, the dynamic routing protocol of the virtual router and the internal router is extended, and a packet of a new type is generated.

In step 1101, the router A is assigned as the master router. In this step, the dynamic routing protocol of the master router A is extended, and the master router A generates the packet of the new type, i.e., the Type 9 Opaque LSA. Table 2 is a schematic view of the format of the extended Type 9 Opaque LSA.

TABLE 2

| 0 | | 15 16 | | 23 24 | 31 |
|---|---|---|---|---|---|
| LS life | | | Option | | LS type = 9 |
| Opaque type | | Opaque ID | | | |
| Advertising router | | | | | |
| LS Serial Number | | | | | |
| LS checksum | | | Length | | |
| Opaque information | | | | | |

The packet format shown in Table 2 is a Type 9 Opaque LSA format based on the existing Type 9 Opaque LSA format after protocol extension. Comparing with the format before the extension, the difference lies in the Transparent Type and Transparent ID. Further, the Transparent information is extended, and the binding relation of the actual IP address and the virtual IP address is set in the Transparent information.

Similar to the master router, other actual physical routers (i.e., backup routers) in the virtual router also generate a packet of a new type (i.e., Type 9 Opaque LSA), and send it to the internal router.

In step 1103, each physical router uses the actual IP address to establish the neighbor relation in the dynamic routing protocol with the internal router, and exchanges the routing information; and the internal router obtains the virtual IP address.

The specific operation of this step is completely the same as step 1003, and after exchanging routing information with the neighbor router, the internal router parses the binding relation in the received Type 9 Opaque LSA. The virtual IP address 10.1.1.5 is obtained according to the actual IP address 10.1.1.1 of the master router A.

In step 1104, the internal router uses the virtual IP address to send the information to the virtual router. According to the VRRP mechanism, the information is sent to the master router A.

The specific operation of this step is completely the same as step 1004, and will not be described again here.

In step 1105, when the master router fails, the master router transited, the transited master router generates the packet of the new type, and sends the packet to the internal router.

In this step, the method of the master router transiting is completely the same as step 803. After the master router is transited, the router B becomes the master router, the master router B generates the extended packet Type 9 Opaque LSA, and sends the packet to the internal router. The packet generated by the master router B is the same as the packet generated by the master router A.

In step 1106, the internal router still sends the information to the virtual router. According to the VRRP mechanism, the information is sent to the master router B.

The master router has been transited as the router B, before the routes of the internal router is converged, that is, before deleting the neighbor information of the router A, the internal router still sends the information to be sent to the external network to the virtual router according to the virtual IP address 10.1.1.5. After the routing information of the internal router is converged, the internal router obtains the packet of the master router B, which is the same as the packet of the master router A. The acquired virtual IP address is still 10.1.1.5, and the internal router still sends the information to be sent to the external network to the virtual router according to the virtual IP address 10.1.1.5. According to the VRRP mechanism, the information is sent to the master router B.

In the embodiments shown in FIGS. 8, 9, 10 and 11, every internal router uses the obtained virtual IP address as the IP address of the next hop in route calculation, and sends the information to be sent to the external network to the virtual router. When the master router fails, the VRRP mechanism may switch the master router to be a new router, and the transited router can receive the information sent by the internal router. The technical solutions provided by the present invention are capable of solving the problem that the interval of information is long because the transited master router cannot receive the information sent by the internal router within the time difference between the master router transiting according to the VRRP mechanism and the dynamic routing protocol transiting by the internal router.

In the embodiments above, the VRRP mechanism and the OSPF dynamic routing protocol are taken as an example to describe the method, system and router for the communication of the internal router and the virtual router. Of course, the method, system and router of the present invention are also applicable to other backup mechanisms and dynamic routing protocols with the same principles, for example, the HSRRP backup mechanism of Cisco. In the embodiments above, the internal router and the virtual router are taken as an example to describe the method and system for communication between IP devices. In addition to routers, other IP devices that are in the same principles as the routers and applicable to the present invention, for example, firewall, gateway, and switch, shall also fall in the scope of the present invention.

It will be apparent to those skilled in the art that various modifications and variations can be made to the structure of the present invention without departing from the scope of the invention. In view of the foregoing, it is intended that the present invention cover modifications and variations of this invention provided they fall within the scope of the following claims and their equivalents.

What is claimed is:

1. A method for communication between Internet Protocol (IP) devices, comprising:
    establishing, by an internal router, a neighbor relation in a dynamic routing protocol with each of physical routers in a virtual router, using actual IP address;
    receiving, by the internal router, a dynamic routing protocol control packet sent by said each of physical routers in the virtual router;
    obtaining a virtual IP address according to the dynamic routing protocol control packet and a correspondence relation of the actual IP address and the virtual IP address;
    receiving, by a first neighbor module of said internal router, the dynamic routing protocol control packet carrying an actual IP address and a Type 9 Link State Advertisement (LSA) packet carrying a binding relation of the actual IP address and the virtual IP address sent by each of the physical routers, obtaining the actual IP address according to the dynamic routing protocol control packet, obtaining the binding relation of the actual IP address and the virtual IP address from the Type 9 LSA and sending the actual IP address and the binding relation to a first calculating module of said internal router;
    finding out, by said first calculating module of said internal router, that the IP address of the next hop is the actual IP address of the physical router according to the dynamic routing protocol when performing route calculation, obtaining the virtual IP address according to the binding relation by using the actual IP address, and substituting the virtual IP address for the IP address of the next hop; and
    using the virtual IP address as a next hop address and sending information to an external network to the virtual router.

2. The method according to claim 1, if the dynamic routing protocol control packet carries an actual IP address of a physical router, wherein:
    the obtaining the virtual IP address according to the dynamic routing protocol control packet comprises: obtaining the actual IP address from the dynamic routing protocol control packet, searching a preset correspondence relation of the actual IP address and the virtual IP address by using the actual IP address, and obtaining the virtual IP address corresponding to the actual IP address.

3. The method according to claim 1, if a link data field in the dynamic routing protocol control packet carries the virtual IP address of the virtual router, wherein:
    the obtaining the virtual IP address according to the dynamic routing protocol control packet comprises: obtaining the virtual IP address from the link data field in the dynamic routing protocol control packet.

4. The method according to claim 3, wherein:
    after obtaining the virtual IP address from the link data field in the dynamic routing protocol control packet, the method further comprises: finding out that the IP address of the next hop is the virtual IP address according to the dynamic routing protocol when performing route calculation.

5. The method according to claim 1, if the dynamic routing protocol control packet carries an actual IP address and a Type 9 Link State Advertisement (LSA) of a physical router, wherein:
    the obtaining the virtual IP address according to the dynamic routing protocol control packet comprises: obtaining a binding relation of the virtual IP address and the actual IP address from the Type 9 LSA, searching the binding relation by using the actual IP address, and obtaining the virtual IP address corresponding to the actual IP address.

6. The method according to claim 5, wherein:
    searching the binding relation by using the actual IP address, and obtaining the virtual IP address corresponding to the actual IP address comprise: finding out that the IP address of the next hop is the actual IP address of the physical router when performing router calculation, obtaining the virtual IP address according to the binding relation by using the actual IP address, and substituting the virtual IP address for the IP address of the next hop.

7. The method according to claim 1, if the dynamic routing protocol control packet contains link data set to be the virtual IP address, the step of obtaining a virtual IP address according to the dynamic routing protocol control packet further comprises:
    obtaining the virtual IP address according to the dynamic routing protocol control packet, finding out that the IP address of the next hop is the virtual IP address according to the dynamic routing protocol when performing route calculation.

8. The method according to claim 1, if the dynamic routing protocol control packet carries an actual IP address, the step of obtaining a virtual IP address according to the dynamic routing protocol control packet further comprises:
    obtaining the actual IP address according to the dynamic routing protocol control packet, configuring a correspondence relation of the virtual IP address and the actual IP address in advance, finding out that the IP address of the next hop is the actual IP address of the physical router according to the dynamic routing protocol when performing route calculation, finding the virtual IP address according to the correspondence relation by using the actual IP address, and substituting the virtual IP address for the IP address of the next hop.

9. A system for communication between Internet Protocol (IP) devices, comprising:
    a virtual router, wherein the virtual router comprises multiple physical routers, one of the physical routers is a master router and the other physical routers are backup routers, and each of the physical routers is adapted to send a dynamic routing protocol control packet; and an internal router, adapted to receive the dynamic routing protocol control packet carrying an actual IP address and a Type 9 Link State Advertisement (LSA) packet carrying a binding relation of the actual IP address and the virtual IP address sent by each of the physical routers, obtaining the actual IP address according to the dynamic routing protocol control packet, obtaining the binding relation of the actual IP address and the virtual IP address from the Type 9 LSA, and sending the actual IP address and the binding relation to a calculating module of said internal router; and wherein the calculating module of said internal router finds out, that the IP address of the next hop is the actual IP address of the physical router according to the dynamic routing protocol when performing route calculation obtains the virtual IP address according to the binding relation by using the actual IP address, substitutes the virtual IP address for the IP address of the next hop, uses the virtual IP address as a next hop address, and sends information to be sent to an external network to the virtual router; and wherein, the master router in the virtual router receives the information.

10. The system according to claim 9, wherein each of the physical routers comprises a control packet generating module and an information receiving module, and the internal router comprises a control packet receiving and processing module and an information sending module;

the control packet generating module is adapted to generate the dynamic routing protocol control packet carrying an actual IP address and send the dynamic routing protocol control packet;

the control packet receiving and processing module is adapted to obtain the virtual IP address according to the dynamic routing protocol control packet;

the information sending module is adapted to use the virtual IP address as a next hop address, and send the information to be sent to the external network to the information receiving module of the master router; and the information receiving module is adapted to receive the information.

11. The system according to claim 10, wherein said each of the physical routers comprises a control packet generating module and an information receiving module, and the internal router comprises a control packet receiving and processing module and an information sending module;

the control packet generating module is adapted to generate the dynamic routing protocol control packet carrying the virtual IP address and send the dynamic routing protocol control packet;

the control packet receiving and processing module is adapted to obtain the virtual IP address from the dynamic routing protocol control packet;

the information sending module is adapted to use the virtual IP address as a next hop address, and send the information to be sent to the external network to the information receiving module of the master router; and the information receiving module is adapted to receive the information.

12. A router, comprising a control packet receiving and processing module and an information sending module, wherein:

the control packet receiving and processing module is adapted to receive a dynamic routing protocol control packet sent by each of physical routers in a virtual router, and obtain a virtual IP address according to the dynamic routing protocol control packet;

the information sending module is adapted to use the virtual IP address as a next hop address, and send information to be sent to an external network to the virtual router; and wherein the control packet receiving and processing module comprises:

a first neighbor module, adapted to receive the dynamic routing protocol control packet carrying an actual IP address and a Type 9 Link State Advertisement (LSA) packet carrying a binding relation of the actual IP address and the virtual IP address sent by each of the physical routers, obtains the actual IP address according to the dynamic routing protocol control packet, obtains the binding relation of the actual IP address and the virtual IP address from the Type 9 LSA, and sends the actual IP address and the binding relation to the first calculating module; and the first calculating module, adapted to find out that the IP address of the next hop is the actual IP address of the physical router according to the dynamic routing protocol when performing route calculation, obtains the virtual IP address according to the binding relation by using the actual IP address, and substitutes the virtual IP address for the IP address of the next hop.

13. A virtual router, comprising: a plurality of physical routers, one of the physical routers is a master router, the other physical routers are backup routers, and each of the physical routers comprises:

a control packet generating module, adapted to generate a dynamic routing protocol control packet carrying an actual IP address and send the dynamic routing protocol control packet, wherein a link data field in the dynamic routing protocol control packet carries a virtual IP address of the virtual router, or a Type 9 Link State Advertisement (LSA) field in the dynamic routing protocol control packet carries a binding relation of the virtual IP address and the actual IP address;

an information receiving module, adapted to receive information from an internal router; and a calculating module, adapted to find out that the IP address of the next hop is the actual IP address of the physical router according to the dynamic routing protocol when performing route calculation, obtain the virtual IP address according to the binding relation by using the actual IP address, and substitute the virtual IP address for the IP address of the next hop.

* * * * *